United States Patent
Goto et al.

(10) Patent No.: US 11,033,369 B2
(45) Date of Patent: Jun. 15, 2021

(54) DENTAL MILL BLANK HAVING MULTIPLE LAYERS THAT ARE VISUALLY IDENTIFIABLE

(71) Applicant: SHOFU INC., Kyoto (JP)

(72) Inventors: Masanori Goto, Kyoto (JP); Yusei Kadobayashi, Kyoto (JP)

(73) Assignee: SHOFU INC., Kyoto (JP)

( * ) Notice: Subject to any disclaimer, the term of this patent is extended or adjusted under 35 U.S.C. 154(b) by 0 days.

(21) Appl. No.: 15/181,561

(22) Filed: Jun. 14, 2016

(65) Prior Publication Data
US 2017/0056140 A1 Mar. 2, 2017

(30) Foreign Application Priority Data
Aug. 28, 2015 (JP) .............................. JP2015-168401

(51) Int. Cl.
*A61C 13/09* (2006.01)
*A61C 13/00* (2006.01)

(52) U.S. Cl.
CPC .......... *A61C 13/09* (2013.01); *A61C 13/0022* (2013.01)

(58) Field of Classification Search
CPC ...... A61C 13/09; A61C 13/0022; A61C 13/00
See application file for complete search history.

(56) References Cited

U.S. PATENT DOCUMENTS

| | | | |
|---|---|---|---|
| 4,970,032 A | 11/1990 | Rotsaert | |
| 2006/0257823 A1 | 11/2006 | Pfeiffer et al. | |
| 2009/0181346 A1 | 7/2009 | Orth | |
| 2013/0224454 A1* | 8/2013 | Jung | A61C 13/0006 428/213 |
| 2014/0377718 A1* | 12/2014 | Korten | A61C 5/77 433/218 |

FOREIGN PATENT DOCUMENTS

| | | |
|---|---|---|
| DE | 202012100359 | 3/2012 |
| JP | 4-505113 | 9/1992 |

(Continued)

OTHER PUBLICATIONS

Translation of WO 2013-072287 (Year: 2013).*

(Continued)

*Primary Examiner* — Maria V Ewald
*Assistant Examiner* — Daniel P Dillon
(74) *Attorney, Agent, or Firm* — Wenderoth, Lind & Ponack, L.L.P.

(57) ABSTRACT

In color reproduction for a dental restorative material, in order to achieve a color that closely matches the color of the natural tooth, one technique that is used is to form a mill blank by laminating layers of materials having different colors. However, misidentification of layers frequently occurs. The present invention is a dental mill blank having a plurality of layers and the dental mill blank has a visual identifying portion by which the plurality of layers are visually identifiable. The visual identifying portion may be provided by color or by structure. Providing the visual identifying portion by color refers to coloring the surface of a layer of the dental mill blank and providing the visual identifying portion by structure refers to forming microscopic or macroscopic irregularities in the entire periphery or part of a layer surface.

18 Claims, 3 Drawing Sheets

(A)

(B)

(56) References Cited

FOREIGN PATENT DOCUMENTS

| JP | 2008-539919 | 11/2008 | | |
|----|----|----|----|----|
| JP | 2009-536056 | 10/2009 | | |
| WO | 2009/154301 | 12/2009 | | |
| WO | 2013/072287 | 5/2013 | | |
| WO | WO-2013072287 A1 * | 5/2013 | ......... | A61C 13/0022 |
| WO | 2015/073365 | 5/2015 | | |

OTHER PUBLICATIONS

Japanese Office Action dated Sep. 29, 2015 issued in corresponding Japanese Patent Application No. 2015-168401 (with English translation).

Japanese Office Action dated Jan. 8, 2016 issued in corresponding Japanese Patent Application No. 2015-168401 (with English translation).

Office Action dated Feb. 3, 2020, in the corresponding CN Patent application No. 201610423039.3, together with English translation.

* cited by examiner

[Fig.1]
(A)
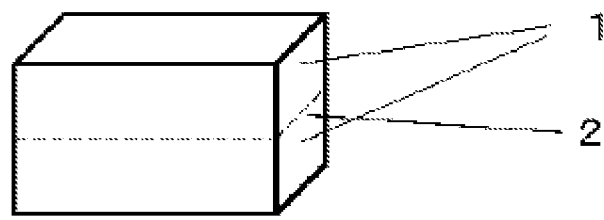
(B)
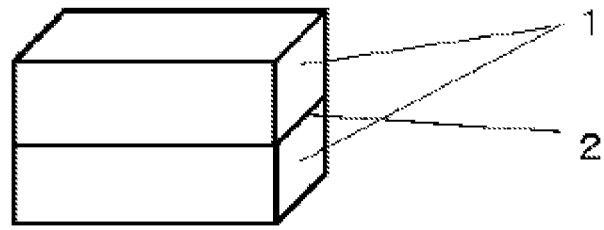
(C)
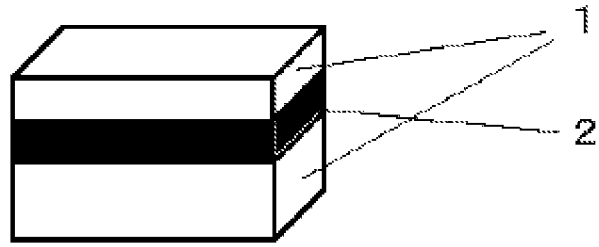

[Fig.2]
(A)
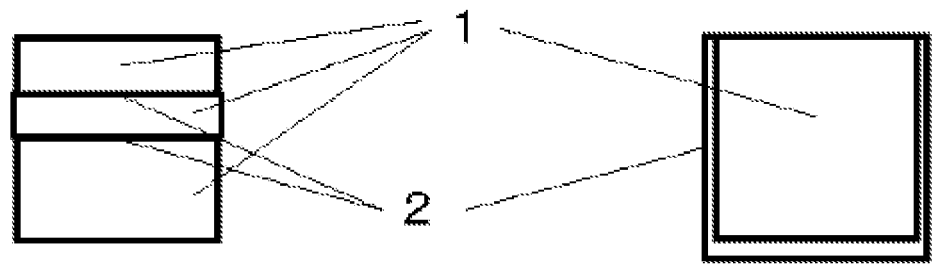
(B)
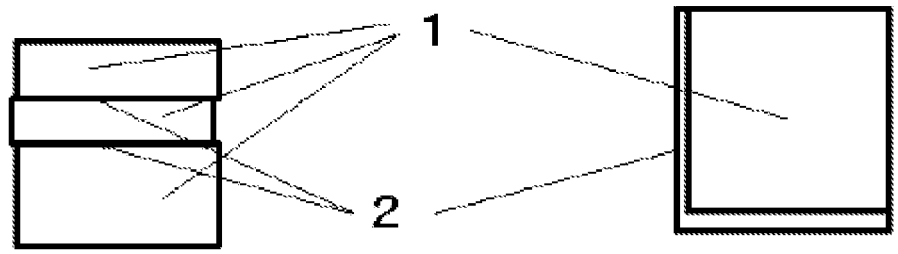

[Fig.3]
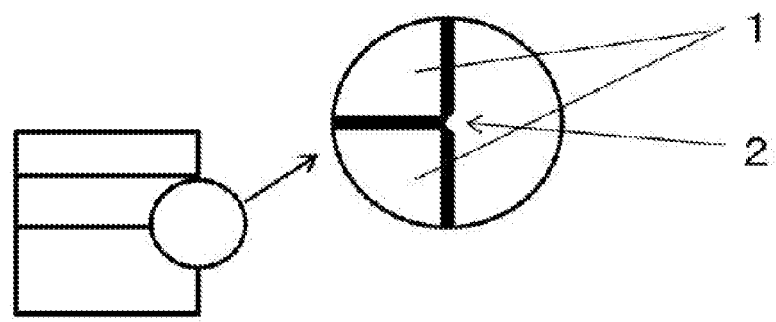

DENTAL MILL BLANK HAVING MULTIPLE LAYERS THAT ARE VISUALLY IDENTIFIABLE

BACKGROUND OF THE INVENTION

Field of the Invention

The present invention relates to a technology for a dental mill blank having a layered structure for use in the field of dentistry, and more particularly to a dental mill blank for CAD/CAM applications with a layered structure that is visually identifiable.

Description of the Related Art

In the field of dentistry, a method for producing a dental restorative material using CAD/CAM technique is known in which the dental restorative material is milled from a mill blank in the form of a block or a disc, for example. In recent years, in order to impart a color that closely matches the color of the natural tooth to such dental restorative materials milled using CAD/CAM technique, one technique that is used is to form a mill blank having a multi-layer structure by laminating layers of pastes having different colors. Specifically, the mill blank has a multi-layer structure in which, for example, the layers are laminated together in a complex manner such that the layers have different colors, transparencies, properties, thicknesses, etc. and even each layer has a varying thickness. However, under the circumstances, it is impossible to accurately distinguish the layers in the multi-layer structure by appearance. As a result, errors such as placing the mill blank in a wrong direction sometimes occur in a milling operation using CAD/CAM technique with the result that a dental restorative material as designed cannot be obtained. Conventionally, a letter indicating "upper", "lower", or the like is sometimes printed on a mill blank to define the direction in which it is to be placed but occasionally the letter is overlooked and also the locations of the layer-to-layer transition areas in the multi-layer structure cannot be clearly ascertained. Furthermore, when attaching a jig to a mill blank to secure it to a CAM machine or when packaging a mill blank, the direction in which the mill blank is to be placed is unclear and therefore such a case may occur that the jig is attached to an incorrect location or the packaging is in a wrong direction in the case of using an automated machine, for example.

WO2009154301 discloses providing gradations of color in which the boundaries are unclear. Although reproduction of gradations of color in which the boundaries are unclear is possible, the direction of layer transition is difficult to ascertain, and therefore such a case may occur that the mill blank is mounted in a wrong direction for example when mounted to a CAM machine or that the location where milling is to be applied cannot be determined.

In conventional dental mill blanks for CAD/CAM applications, the individual layers that constitute the multi-layer structure cannot be accurately identified in the CAD/CAM process. As a result, it is impossible to identify the location where a dental restorative material is to be milled and consequently there are cases in which a milled product as designed cannot be obtained or the mill blank is placed in a wrong direction when it is placed in the CAM. In addition, in production of dental restorative materials by a milling process, dental mill blanks used for front teeth and dental mill blanks used for molar teeth are different from each other in the layer structure because the aesthetics required differ between them. However, in conventional dental mill blanks for CAD/CAM applications, the number of layers is difficult to ascertain, and therefore the error of using a dental mill blank different from the intended one can occur. Furthermore, in use of a laser, a camera, or the like for automated operations of attaching a jig or packaging, for their applications, there has been a need for identifiability of the multi-layer structure to enable accurate determination of the location and direction of a mill blank.

SUMMARY OF THE INVENTION

The present invention is a dental mill blank formed of multiple layers, and the dental mill blank is characterized by containing a visual identifying portion that visually represents the layers. According to the present invention, the visual identifying portion may be provided by color or by structure. Providing the visual identifying portion by color refers to coloring the surface of a layer of the dental mill blank, examples of which include coloring the entire periphery or part of a layer surface and providing linear coloring between adjacent layers. On the other hand, providing the visual identifying portion by structure refers to forming microscopic or macroscopic irregularities in the entire periphery or part of a layer surface. Examples thereof include: in the forming of a dental mill blank, using a forming die having a portion with different inner surface roughness so as to form microscopic irregularities in the surface of the formed article to provide identifiability utilizing the light reflection effect; in the forming, shaping the dental mill blank so as to have macroscopic irregularities such as a step to provide identifiability; and after the forming, performing a secondary process such as machining to form macroscopic irregularities to provide identifiability.

A dental mill blank of the present invention may be configured such that at least one layer of the multiple layers has a visual identifying portion along the entire periphery or part thereof. In the case where the visual identifying portion is to be provided at part of the at least one layer of the multiple layers, the visual identifying portion can be formed easily. On the other hand, in the case where the visual identifying portion is to be provided along the entire periphery of one layer, it is possible to enhance the identifiability further and thus it is preferred.

Preferably, the dental mill blank of the present invention is configured such that the multiple layers are 2 to 8 layers. When the number of layers is in such a range, the dental mill blank can be easily fabricated. Preferably, the dental mill blank of the present invention is configured such that the multiple layers have the same thickness. When this configuration is employed, fabrication of the dental mill blank is easy, and also, upon identification of one layer, all the multiple layers constituting the dental mill blank can be easily identified. Preferably, the dental mill blank of the present invention is configured such that at least one layer of the multiple layers has a thickness different from the thickness of the other layers. When this configuration is employed, based on the location of the layer having a different thickness, immediate determination of the direction in which the mill blank is to be placed can be made possible. In this case, it is preferred that the thicknesses of all the layers are different from one another and particularly it is preferred that the thickness gradually increases or decreases from the layer at one end toward the layer at the other end in the stacking direction.

Dental mill blanks according to the present invention have a multi-layer structure such that the individual layers are identifiable and therefore facilitate identification of the location where a dental restorative material is to be milled. As a result, it is possible to minimize the possibility of failing to obtain a milled product as designed. In addition, it is possible to easily determine the direction in which the dental mill blank is to be placed when it is mounted to a CAM and also it is possible to minimize the error of using a dental mill blank different from the intended one, e.g. a dental mill blank having a different number of layers. Furthermore, when the visual identifying portion is provided only at the outer layer surface of the dental mill blank, the visual identifying portion has no influence on the milled dental restorative material. Automated machines for packaging or cameras in machines such as an automated machine for attaching a jig perform accurate packaging or accurate attachment of a jig without making a mistake in determining the location where the dental restorative material is to be milled and the direction in which the dental mill blank is to be placed. Consequently, production efficiency is improved.

DETAILED DESCRIPTION OF THE PREFERRED EMBODIMENTS

A dental mill blank refers to, for example, a formed article from which a dental restorative material is milled using CAD/CAM technique. More specifically, examples thereof include: a block in the shape of a rectangular prism formed to have a dimension of 1 to 2 cm (one side) by 1 to 2 cm (one side) by 2 to 3 cm (height); a rectangular prism formed to have a dimension of 1 to 3 cm (height) by 6 to 15 cm (one side) by 6 to 15 cm (one side); and a cylindrical disc formed to have a dimension of 1 to 3 cm (height) by 6 to 15 cm (diameter). A dental mill blank of the present invention may be fabricated by subjecting laminated multiple layers of pastes having different colors to a forming process and, for example, it may be formed of 2 to 8 layers. In particular, the dental mill blank is preferably formed of at least three layers including an enamel colored layer, a dentin colored layer, and a cervical part colored layer, and more preferably it is formed of five layers such that between the enamel colored layer and the dentin colored layer is provided a layer having an intermediate color between enamel and dentin, and between the dentin colored layer and the cervical part colored layer is provided a layer having an intermediate color between dentin and cervical part color. These layers may be stacked in any order without causing a problem. The state of superposition of adjacent layers is not particularly limited but in many cases the lamination is formed such that the interface between layers is flat or in some cases the lamination is formed such that the interface is curved.

Preferably, the visual identifying portion is provided at the surface of an outer layer of the dental mill blank so that the individual layers are visually distinguishable from outside the dental mill blank. The manner in which the visual identifying portion is provided is not particularly limited as long as the layers can be visually identified by a person, a camera in an automated machine, or other means, but for example the visual identifying portion may be provided by color or by structure at the surface of a layer of the dental mill blank. The visual identifying portion that can be visually identified by a person refers to a portion such that, when visible light impinges on the mill blank and the visual identifying portion and the reflected light is received by a person's eyes, the stimulus received by the eyes from the visual identifying portion differs from the stimulus received by the eyes from the mill blank. The visual identifying portion that can be visually identified by a camera refers to a portion such that, when light impinges on the mill blank and the visual identifying portion and the reflected light is received by a light sensor such as of a camera and then the signals received by the light sensor are calculated by a computer, the results for the visual identifying portion differ from the results for the mill blank. Providing the visual identifying portion by color refers to coloring the surface of a layer of the dental mill blank, examples of which include coloring the entire periphery or part of a layer surface and providing linear coloring between adjacent layers. On the other hand, providing the visual identifying portion by structure refers to forming microscopic or macroscopic irregularities in the entire periphery or part of the layer surface. Examples thereof include: in the forming of a dental mill blank, using a forming die having a portion with different inner surface roughness so as to form microscopic irregularities in the surface of the formed article to provide identifiability utilizing the light reflection effect; in the forming, shaping the dental mill blank so as to have macroscopic irregularities such as a step to provide identifiability; and after the forming, performing a secondary process such as machining to form macroscopic irregularities to provide identifiability. Combinations of any of these may be applied to the layer surface of the dental mill blank. Among these, for clear visual recognition of the visual identifying portion, coloring is preferred as a means to provide the visual identifying portion. In addition, the visual identifying portion is preferably colored by a color other than the color used for the layer. Furthermore, the color of the visual identifying portion is preferably an opaque color. For the coloring, colors such as red, green, blue, yellow, white, or black may be freely selected, but white is preferred. For clearer identification of the layers by touching by hand, preferably a step is provided by machining and/or forming. The step is preferably sized in the range of 0.05 to 1.00 mm. When such a step is provided, the visual identifying portion can be colored white and therefore it is preferred.

It is preferred that the visual identifying portion is provided along the entire periphery of the layer, but in the case where a jig for securing to a CAM system is connected to the dental mill blank, the visual identifying portion may not be provided at the surface to which the jig is secured. This is because the portion to which the jig is attached is difficult to visually identify or because a step, if provided, can interfere with the bond between the dental mill blank and the jig.

The visual identifying portion according to the present invention provides identifiability in a non-limiting manner and, for example, the visual identifying portion may be provided only at part of the layer. Further, according to the present invention, the visual identifying portion may be employed not for all the layers but for only one or more of the layers; however, it is preferred that the visual identifying portion is employed for all the layers. Furthermore, preferably, the visual identifying portion is employed for the entire peripheries of all the layers of the multiple layers.

Now a description is given with reference to the drawings. FIG. 1 shows conceptual diagrams of dental mill blanks having a visual identifying portion provided by coloring. The layers 1 are each provided with a different color, and FIGS. 1A and 1B each illustrate a two-layer construction with an enamel color and a dentin color. FIG. 1C illustrates a three-layer construction with a cervical part color, a dentin color, and an enamel color. FIG. 1A illustrates a dental mill blank in the shape of a rectangular prism in which the dashed line at the central portion of the rectangular prism constitutes the visual identifying portion 2, which indicates that there are two layers. FIG. 1B illustrates a dental mill blank in the shape of a rectangular prism in which the solid line at the central portion of the rectangular prism constitutes the visual identifying portion 2, which indicates that there are two layers. In the examples of FIGS. 1A and 1B, instead of the visual identifying portion 2 constituted by a dashed line or a solid line, an alternative visual identifying portion 2 may be provided by coloring the entirety of the layer to which a jig for securing to a CAM system is to be connected. With this configuration, the layer to which a jig for securing to a CAM system is to be connected can be easily identified and therefore, in milling of a dental restorative material using CAD/CAM technique, the direction in which the mill blank is to be placed in the automated machine can be easily identified. FIG. 1C illustrates a dental mill blank in the shape of a rectangular prism in which the intermediate layer of the rectangular prism is entirely colored to constitute a visual identifying portion, which indicates that there are three layers. In all cases, clear identification of each layer is possible when viewed from the outside. In the example of FIG. 1C, in particular, the two layers sandwiching the intermediate layer have different thicknesses. Thus, by the difference in thickness between the layers sandwiching the intermediate layer, it is possible to easily identify the direction in which the mill blank is to be placed in an automated machine. In the example of FIG. 1C as well, instead of coloring the entirety of the intermediate layer, an alternative visual identifying portion 2 may be provided by coloring the entirety of the layer to which a jig for securing to a CAM system is to be connected. In this case, a visual identifying portion constituted by a solid line or dashed line may be provided between the layer on the opposite side from the colored layer and the intermediate layer. Alternatively, the visual identifying portion constituted by an entirely colored layer may not be provided but instead a visual identifying portion constituted by a solid line and a visual identifying portion constituted by a dashed line may be provided. In this case, for example, the visual identifying portion constituted by a solid line is provided between the layer to which a jig is to be connected and the intermediate layer, and the visual identifying portion constituted by a dashed line is provided between the layer on the opposite side from the layer to which a jig is to be connected and the intermediate layer. With this configuration, by the difference between the solid line and the dashed line, the layer to which a jig is to be connected can be easily identified. Such identification of the layer to which a jig is to be connected can also be accomplished for example by differentiating the color and/or thickness of the line between the layer to which a jig is to be connected and the intermediate layer from the color and/or thickness of the line between the layer on the opposite side from the layer to which a jig is to be connected and the intermediate layer. With this configuration of the visual identifying portions, the layers can be provided with the same thickness. By suitably combining different types of lines, colors and thicknesses, different visual identifying portions may be provided.

FIG. 2 shows conceptual diagrams of dental mill blanks having a visual identifying portion constituted by a step. In the examples of FIG. 2 as well, the dental mill blank consists of a three-layer construction with a cervical part color, a dentin color, and an enamel color. In the examples of FIG. 2, the visual identifying portion is constituted by a step so that each layer 1 can be clearly identified when viewed from the outside. In FIG. 2A, the intermediate layer is formed so as to project in three directions with respect to the other two layers and the step formed of the projection constitutes a visual identifying portion. In FIG. 2A, the drawing on the left side is a drawing illustrating the lamination to clarify that three layers are laminated and the drawing on the right side is a drawing for clarifying the projected shape of the step. In FIG. 2B, the intermediate layer is formed so as to project in two directions and be recessed in one direction with respect to the other two layers and the steps formed of the projections and the recess constitute a visual identifying portion. In FIG. 2A, the drawing on the left side is a drawing, or a conceptual diagram as viewed in one direction, illustrating the lamination to clarify that three layers are laminated and the drawing on the right side is a drawing for clarifying the projected shape of the step. In the examples of FIGS. 2A and 2B as well, instead of the configuration in which the intermediate layer is formed to have a projection, the layer to which a jig for securing to a CAM system is to be connected may be formed to have a projection. In this case, a visual identifying portion constituted by coloring of a solid line or dashed line, for example, may be provided between the layer on the opposite side from the layer to which a jig is to be connected and the intermediate layer. With this configuration, by the difference between the visual identifying portion constituted by a step and the visual identifying portion provided by coloring, it is possible to easily identify the direction in which the mill blank is to be placed in an automated machine.

FIG. 3 shows a conceptual diagram of a dental mill blank having a visual identifying portion constituted by a step. FIG. 3 illustrates, in the conceptual diagram, a dental mill blank provided with a visual identifying portion constituted by a recess that indicates an inter-layer area. The drawing on the left side is a conceptual diagram illustrating the lamination to clarify that three layers are laminated and the drawing on the right side is an enlarged view of the visual identifying portion in the left drawing. As illustrated in the right drawing, a recess having a triangular shape is formed between layers and the recess constitutes the visual identifying portion. Such a recess may be formed continuously or intermittently along the entire periphery of a layer between layers. In the example of FIG. 3, for the case of identifying the direction in which a mill blank is to be placed in an automated machine, the configuration may be such that a continuous recess is formed along the entire periphery between the layer to which a jig is to be connected and the intermediate layer to constitute a visual identifying portion; and an intermittent recess is formed between the layer on the opposite side from the layer to which a jig is to be connected and the intermediate layer to constitute a visual identifying portion. The recesses may be formed to have different widths or depths to thereby enable identification of the direction in which a mill blank is to be placed in an automated machine. In the present invention, the visual identifying portion may be provided by suitably combining any of coloring, steps and recesses.

INDUSTRIAL APPLICABILITY

The present invention is a dental mill blank, and specifically, the invention is applicable to a block or a disc from which a dental restorative material is fabricated by a milling process using a CAD/CAM system in the field of dentistry.

BRIEF DESCRIPTION OF THE DRAWINGS

FIG. 1 shows conceptual diagrams of dental mill blanks having a visual identifying portion provided by coloring.

FIG. 2 shows conceptual diagrams of dental mill blanks having a visual identifying portion constituted by a step.

FIG. 3 shows a conceptual diagram of a dental mill blank having a visual identifying portion constituted by a wedge-shaped step.

What is claimed is:

1. A dental mill blank comprising:
a plurality of layers having different colors including a protrusion layer, and
a visual identifying portion that visually represents the layers, wherein,
the plurality of layers are laminated to form a stack of the layers, and the protrusion layer protrudes in only two directions with respect to each adjacent layer, when viewed from a top or a bottom of the stack,
the dental mill blank has a block shape or a disc shape,
the visual identifying portion is a linear step that is positioned between adjacent layers,
the visual identifying portion is not held by a jig for securing to a CAM system, and
each of the protrusions forms the linear step.

2. A dental mill blank comprising:
a plurality of layers having different colors including a protrusion layer, and
a visual identifying portion that visually represents the layers, wherein,
the protrusion layer protrudes in only three directions with respect to each adjacent layer,
the dental mill blank has a block shape or a disc shape,
the visual identifying portion is a linear step that is positioned between adjacent layers,
the visual identifying portion is not held by a jig for securing to a CAM system, and
each of the protrusions forms the linear step.

3. A dental mill blank comprising:
a plurality of layers having different colors including a protrusion layer, and
a visual identifying portion that visually represents the layers, wherein,
the protrusion layer protrudes in only two directions and is recessed in only one direction with respect to each adjacent layer,
the dental mill blank has a block shape or a disc shape,
the visual identifying portion is a linear step which is positioned between adjacent layers,
the visual identifying portion is not held by a jig for securing to a CAM system, and
each of the protrusions and recesses forms the linear step.

4. The dental mill blank according to claim 1, wherein the plurality of layers comprise 2 to 8 layers.

5. The dental mill blank according to claim 1, wherein the plurality of layers have the same thickness.

6. The dental mill blank according to claim 1, wherein the thicknesses of all the layers are different from one another.

7. The dental mill blank according to claim 1, wherein the thickness gradually increases or decreases from the layer at one end toward the layer at the other end in the stacking direction.

8. The dental mill blank according to claim 1, wherein a size of the linear step is 0.05 to 1.00 mm.

9. The dental mill blank according to claim 2, wherein the plurality of layers comprise 2 to 8 layers.

10. The dental mill blank according to claim 2, wherein the plurality of layers have the same thickness.

11. The dental mill blank according to claim 2, wherein the thicknesses of all the layers are different from one another.

12. The dental mill blank according to claim 2, wherein the thickness gradually increases or decreases from the layer at one end toward the layer at the other end in the stacking direction.

13. The dental mill blank according to claim 2, wherein a size of the linear step is 0.05 to 1.00 mm.

14. The dental mill blank according to claim 3, wherein the plurality of layers comprise 2 to 8 layers.

15. The dental mill blank according to claim 3, wherein the plurality of layers have the same thickness.

16. The dental mill blank according to claim 3, wherein the thicknesses of all the layers are different from one another.

17. The dental mill blank according to claim 3, wherein the thickness gradually increases or decreases from the layer at one end toward the layer at the other end in the stacking direction.

18. The dental mill blank according to claim 3, wherein a size of the linear step is 0.05 to 1.00 mm.

* * * * *